US009383124B2

(12) United States Patent
Bonnay et al.

(10) Patent No.: US 9,383,124 B2
(45) Date of Patent: Jul. 5, 2016

(54) METHOD OF REGULATING THE TEMPERATURE OF AN ELEMENT COOLED BY A CRYOREFRIGERATOR WITH PERIODIC OPERATION

(71) Applicant: COMMISSARIAT A L'ENERGIE ATOMIQUE ET AUX ENERGIES ALTERNATIVES, Paris (FR)

(72) Inventors: Patrick Bonnay, Voiron (FR); Sebastian Erhart, Langen (DE); Pascal Carre, Venissieux (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 256 days.

(21) Appl. No.: 14/354,318

(22) PCT Filed: Sep. 24, 2012

(86) PCT No.: PCT/IB2012/055068
§ 371 (c)(1),
(2) Date: Apr. 25, 2014

(87) PCT Pub. No.: WO2013/061178
PCT Pub. Date: May 2, 2013

(65) Prior Publication Data
US 2014/0260336 A1  Sep. 18, 2014

(30) Foreign Application Priority Data

Oct. 28, 2011 (FR) .................................. 11 59857

(51) Int. Cl.
*F25B 9/00* (2006.01)
*F25B 9/14* (2006.01)
*G05D 23/19* (2006.01)

(52) U.S. Cl.
CPC .............. *F25B 9/14* (2013.01); *G05D 23/1951* (2013.01); *F25B 2400/01* (2013.01)

(58) Field of Classification Search
CPC ..... F25B 9/14; F25B 2400/01; G05D 23/1951
See application file for complete search history.

(56) References Cited

U.S. PATENT DOCUMENTS 5,857,342 A * 1/1999 Rohlfing ................. F17C 3/085
505/892
2007/0068175 A1 3/2007 Rampersad et al.

FOREIGN PATENT DOCUMENTS

JP 2004-076955 3/2004
WO 2011/089768 7/2011

OTHER PUBLICATIONS

D.F. He et al., "High-Tc DC ... pulse-tube cooler" Physica C 392-396 (2003) 1416-1419.
S. Grohmann et al., "Development of . . . cryogenic micropump", Cryogenics 45 (2005) 432-438.

* cited by examiner

*Primary Examiner* — Emmanuel Duke
(74) *Attorney, Agent, or Firm* — Clark & Brody (57) ABSTRACT

The invention relates to a method of regulating the temperature of an element cooled by a cryorefrigerator with periodic operation, characterized in that it comprises the following steps: (a) measuring at least the periodic temporal evolution of the temperature T of the element, this evolution making it possible to obtain a temperature signal representative of the periodic operation of the cryorefrigerator; (b) constructing a periodic so-called equivalent thermal flux signal (Soeq), as a function of the temperature signal obtained in step (a); (c) constructing a thermal flux control signal, depending on the equivalent thermal flux signal constructed in step (b), said thermal flux control signal serving also, in return, for the construction of the equivalent thermal flux signal (ScDeq, S*oeq) during step (b); (d) injecting a thermal flux into the element, on the basis of the thermal flux signal constructed in step (c), so as to compensate for the measured periodic variations of the temperature T of the element.

11 Claims, 5 Drawing Sheets

METHOD OF REGULATING THE TEMPERATURE OF AN ELEMENT COOLED BY A CRYOREFRIGERATOR WITH PERIODIC OPERATION

The present invention relates to the field of refrigerating an element, and in particular to cryogenic refrigeration of the element.

More particularly, the present invention relates to cryogenic refrigeration of an element by means of a cryorefrigerator with periodic operation.

Among known periodically-operating cryorefrigerators, mention may be made of gas pulse tubes and of Gifford-MacMahon machines.

Cooling with a cryorefrigerator having periodic operation is generally performed to cool installations to very low temperatures, typically in the range 4 kelvins (K) to 120 K, which installations are subjected to strong operating constraints or for which it is not possible to deliver liquid helium.

Such constraints may be encountered in nuclear applications where the element for cooling is arranged in a confined radioactive medium. Under such circumstances, the use of a helium tank situated outside the nuclear building is very constraining, since it is necessary to transfer the helium to the inside of the building, which implies major heat losses. Furthermore, recovering gaseous helium at the outlet can make it necessary to take particularly constraining precautionary measures.

These constraints may also be encountered for space applications, e.g. for cooling certain components of a satellite.

An advantage of a periodically-operating cryorefrigerator is that it refrigerates without any need to deliver external liquid helium via a liquid helium storage tank.

Nevertheless, a periodically-operating cryorefrigerator leads to temperature variations over time that propagate through the installation and consequently through the element, where it is generally required to maintain the element at a temperature that is constant. The temperature variations to which the element is subjected are attenuated along the cooling chain of the installation, but they still disturb the operation of the element.

Figure 1:
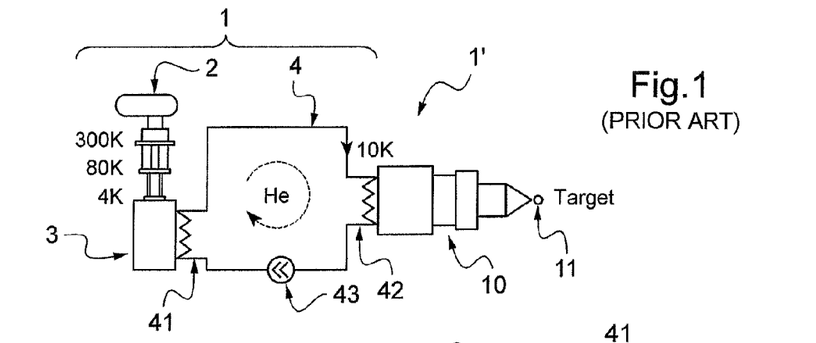

An example application of cooling an element by a periodically-operating cryorefrigerator is shown in FIG. 1.

FIG. 1 is a diagram showing a cryogenic installation 1' having a refrigerator device 1 for cooling an element 10, e.g. a cryogenic clamp 10 of a system enabling inertial nuclear fusion to be obtained with a high power laser, such as the "MegaJoule" laser.

The cryogenic clamp 10 forms the element for which it is desired to regulate temperature.

The cooler device 1 comprises a gas pulse tube 2, a stabilizer 3 for attenuating temperature variations of the gas pulse tube 2, and a gaseous helium cooling circuit 4.

The cooling circuit 4 comprises a first heat exchanger 41 for exchanging heat with the stabilizer 3, a second heat exchanger 42 for exchanging heat with the clamp 10, and means 43 for causing gaseous helium to circulate around the cooling circuit 4.

The end of the cooling clamp 10 supports a target 11 for the laser beam.

The success of fusion experiments using the laser on the target 11 depends strongly on the temperature stability of the target 11.

At present, the cooler device 1 makes it possible to achieve temperature variations of about 10 millikelvins (mK) at the target 11, with the target 11 presenting a temperature that generally lies in the range 18 K to 23 K.

The relative variation in the temperature of the target 11 would appear to be quite small, however it is still troublesome for successfully performing fusion experiments with the laser.

The requirement for temperature stability of the installation cooled with a periodically-operating cryorefrigerator also arises in other applications, in particular in the field of space.

Depending on the type of periodically-operating cryorefrigerator in use, the amplitude of temperature variation at the cold tip of the cryorefrigerator has been measured as lying in the range 300 mK to 2200 mK, with these variations being difficult to attenuate in spite of the presence of a stabilizer within the cooler device.

An object of the invention is thus to propose a method of regulating the temperature of an installation cooled by a cryorefrigerator with periodic operation, which method makes it possible to reduce the temperature variations in the installation, compared with existing techniques.

Another object of the invention is to propose a device for performing the method.

Another object of the invention is to propose a cryogenic installation including the device.

In the particular circumstance of a high power laser for studying inertial nuclear fusion, the invention seeks in particular to obtain temperature variations of millikelvin order at the target.

To achieve at least one of these objects, the invention provides a method of regulating the temperature of an element cooled by a cryorefrigerator with periodic operation, the method being characterized in that it comprises the following steps:

a) measuring at least the periodic time variation of the temperature T of the element (10), this variation serving to obtain a temperature signal representative of the periodic operation of the cryorefrigerator (2);

b) constructing an "equivalent" periodic heat flux signal as a function of the temperature signal obtained in step a);

c) constructing a heat flux control signal depending on the equivalent heat flux signal constructed in step b), said heat flux control signal also serving, by return, in the construction of the equivalent heat flux signal during step b); and d) injecting a heat flux into the element (10) on the basis of the heat flux signal constructed in step c), in order to compensate for the measured periodic variations in the temperature T of the element.

The method of the invention may also comprise the following steps, taken singly or in combination:

the heat flux control signal also depends on a control signal for improving the compensation of the periodic variations in the temperature of the element at low frequencies;

the heat flux injected into the element in step c) depends on the difference between the control signal and the equivalent heat flux signal constructed in step b) in order to limit the heat power injected into the element that is needed for compensating periodic variations of its temperature;

step b) also comprises an additional step consisting in delaying the previously constructed equivalent heat flux signal ($S_{\Phi eq}$) relative to the phase of the temperature signal determined in step a);

a step is provided that consists in estimating the value of the time delay; and the estimation of the time delay comprises the following steps:

b$_1$) injecting an identification signal for identifying the time delay in a thermal system comprising the element for which it is desired to regulate the temperature, and a device for performing the method, the identification signal presenting a waveform and a frequency close to those of the signal representative of the operation of the cryorefrigerator;

b$_2$) determining the phase shift φ of the identification signal at the output from the thermal system, this phase shift being associated with the time delay that is to be estimated;

b$_3$) calculating the phase shift φ$_0$ of this identification signal with a model representing the thermal behavior of the thermal system in the absence of any delay;

b$_4$) calculating the phase shift φ$_r$ associated with the time delay using the following relationship:

$$\phi_r = \phi - \phi_0$$

b$_5$) estimating the time delay at least on the basis of the phase shift φ$_r$ calculated in step b$_4$) and of the frequency of the identification signal, said delay being used for delaying the equivalent heat flux signal.

To achieve this object, the invention also provides a device for performing the method according to any preceding claim for regulating the temperature of an element cooled by a cryorefrigerator with periodic operation, the device being characterized in that it comprises:

at least means for measuring the periodic variation in the temperature T of the element associated with the periodic operation of the cryorefrigerator;

at least means for determining the equivalent heat flux associated with said periodic variation of the temperature T of the element, these means or set of means comprising a computer or a set of computers or a processor or a set of processors;

at least means for injecting a heat flux into the element on the basis of a heat flux control signal depending on the equivalent heat flux signal; and means for injecting the heat flux control signal to the input at least of said means for determining the equivalent heat flux.

The device of the invention may also comprise at least one of the following characteristics, taken singly or in combination:

means are provided that are capable of delivering a control signal for improving the compensation of the periodic variations in the temperature of the element at low frequencies;

the means for injecting a heat flux into the element comprise a variable magnetic field generator associated with an isothermal heat bath for adiabatically magnetizing or demagnetizing a device connected to the element; and said means for determining the periodic variation of the temperature of the element and said means for injecting a heat flux into the element are arranged side by side.

Finally, the invention also proposes a cryogenic installation for cooling an element with a cryorefrigerator with periodic operation, said installation including a stabilizer connected to the cryorefrigerator and a cooling circuit having a first heat exchanger connected to the stabilizer, and a second heat exchanger connected to the element, the installation being characterized in that it further comprises a device of the invention.

Figure 2:
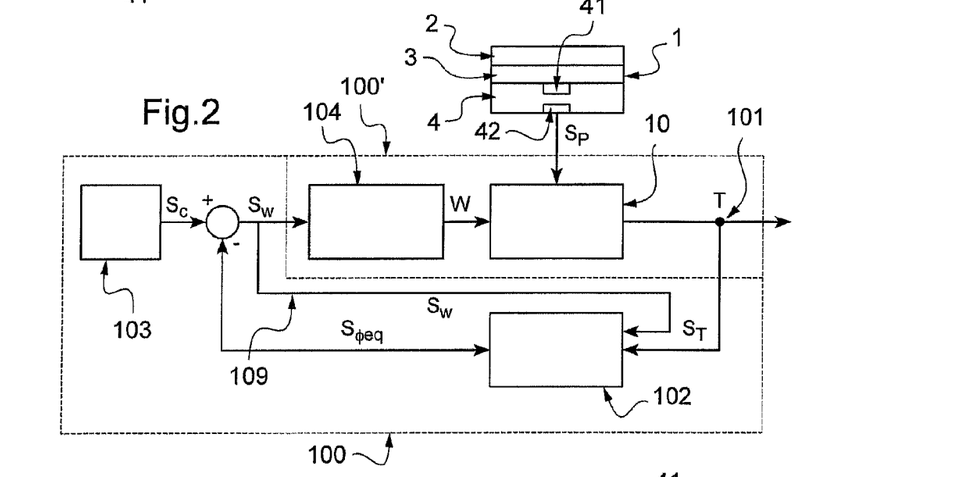
FIG. 2 is a diagram showing an implementation of the method performed in the context of the invention.

The characteristics, objects, and advantages of the invention are set out in the detailed description below made with reference to the following figures:

FIG. 2 shows the general principle of the method of the invention, together with means of the device for performing the method.

The method is a method of regulating the temperature T of an element 10 cooled by a cryorefrigerator with periodic operation.

The method comprises the following steps:

a) measuring at least the periodic time variation of the temperature T of the element, this variation serving to obtain a temperature signal representative of the periodic operation of the cryorefrigerator;

b) constructing an "equivalent" periodic heat flux signal as a function of the temperature signal obtained in step a);

c) constructing a heat flux control signal depending on the equivalent heat flux signal constructed in step b), said heat flux control signal also serving, by return, in the construction of the equivalent heat flux signal during step b); and d) injecting a heat flux into the element on the basis of the heat flux signal constructed in step c), in order to compensate for the measured periodic variations in the temperature T of the element.

The method of the invention thus makes it possible to compensate for the disturbing effects observed at the element 10 (undesired temperature variation), resulting from the periodic operation of the cryorefrigerator.

This method is for application to a thermal system 100' including both said element 10 for which it is desired to regulate temperature, and also the actuator 104. The temperature regulation loop for the element 10 is associated with a device 100, which device is to deliver the heat flux control signal $S_W$ to the actuator 104.

For example, the element 10 may be formed by the clamp of a high power laser for use in studying inertial nuclear fusion, such as the "MegaJoule" laser. The cryogenic clamp is specifically an assembly of a plurality of parts for cooling.

The temperature T of the element may be measured in step a) by means of a temperature sensor 101 forming part of the thermal system 100'.

The temperature sensor 101 that is used may be a resistive sensor. Temperature is obtained by calculation on the basis of the measured resistance and on the basis of the temperature relationship for the sensor 101.

The performance required of this temperature sensor 101 mainly involves great stability, i.e. little drift, associated with a noise level that is as low as possible.

In other words, it is important for the measurement provided by the temperature sensor to be reproducible.

In contrast, the accuracy of the measurement provided by the sensor, i.e. the difference between the real temperature and the temperature as measured by the sensor 101 is of smaller importance, insofar as it is always possible to perform recalibration on a fixed point, using appropriate processor means that are known to the person skilled in the art. For this purpose, it is possible to calibrate the sensor 101 with a reference sensor that has been calibrated by an approved body. In a variant, it is possible to calibrate the sensor 101 by viewing a change of phase: liquid/solid transition (triple point) with the help of a system operating on the ombroscopic technique.

With a resistive type temperature sensor 101 made of germanium, the following characteristics may apply: $\Delta R=0.3$ milliohms (m$\Omega$) for $R_N=20$ ohms ($\Omega$), where $R_N$ is the resistance of the sensor at the nominal temperature $T_N$ and $\Delta R$ is the variation in this resistance about the temperature $T_N$. In another example, with a Cernox™ type resistive temperature sensor 101, $\Delta R=5$ m$\Omega$ for $R_N=1000\Omega$. The signal levels that are measured do not exceed 3 millivolts (mV) to 4 mV with a passband of a few hertz.

The temperature measured by the sensor 101 then constitutes a signal $S_T$ that is transmitted to means 102 forming part of the device 100 (regulation loop), serving to construct the equivalent heat flux signal $S_{\Phi eq}$. This heat flux signal $S_{\Phi eq}$ is equivalent in heat flux terms to the temperature T as measured by the sensor.

The means 102 are constituted by calculation means, such as a computer, a set computers, a processor, or a set of processors, serving to use a thermal model representative of the behavior of the thermal system 100' including the element 10.

Step b) as performed in this way by the means 102 thus serves to produce information associated with variation in the temperature of the element 10 in the form of an equivalent heat flux. For this purpose, step b) also incorporates the signal $S_W$, which is returned to the input of the means 102, in order to provide information about the heat flux to be injected; cf. FIGS. 2 to 4, for example.

This information may then be taken into account by an actuator 104 for actually injecting a heat flux W into the element 10 in order to compensate the temperature variations of the element 10.

This equivalent heat flux is reconstituted on the basis of equations (11) of the model that is given below on the basis of equations (1) to (11).

A thermal model suitable for use in evaluating the heat flux that is equivalent to periodic variation in the temperature T of the element 10 is given below for the situation in which the element is constituted by the cryogenic clamp 10 of a high power laser for studying inertial fusion.

For this purpose, the thermal behavior of the thermal system 100' including the clamp 10, the actuator 104, and the temperature sensor 101 is modeled.

This thermal modeling is in the form of a discrete state representation. In the field of automatic control, a state representation makes it possible to model a dynamic system in matrix form by using state variables. This state representation must then give an account of the state of the system at any future instant, providing initial values are available. Specifically, this representation is discrete so that it can be implemented in calculation means, such as a processor or a computer.

This discrete state representation is written in the form of equation (1):

$$x(k+1)=A \cdot x(k)+B \cdot U(k)$$

$$T(k)=C \cdot x(k) \quad (1)$$

where:

T is the temperature of the cryogenic clamp 10 that is to be regulated;

U is a vector associated with the heat flux received by the cryogenic clamp 10;

x is the state vector of the thermal system 100';

k is a discrete time increment; and

A, B, and C are matrices to be determined.

The state vector x of the thermal system 100' is a minimum set of state variables, i.e. of time-varying magnitudes, that are necessary and sufficient for determining the variation of the thermal system 100', given knowledge of the equations that describe the operation of the thermal system 100', and knowledge of the inputs to the system 100'.

Consequently, the vector x may be a column vector having n variables $x_1, x_2, \ldots, x_n$, where n, the number of components in the vector x, corresponds to the degree of complexity of the thermal model. The number n thus defines the degree of complexity of the thermal model modeling the thermal system 100'.

Under such circumstances, the matrix A is a square matrix of the $n_x * n_x$ type where $n_x$ defines the size of the state vector x of the thermal system 100'.

The matrix B is a matrix of the $n_x * n_u$ type, where $n_u$ is the size of the vector U. For example, if consideration is given to only one actuator 104 in the thermal model, then $n_u=1$. This applies for example to that which was taken into consideration in the test performed on the clamp of the "MegaJoule" laser, as described below under the heading "results of a test". In another example, consideration may be given to other heat flux sources, e.g. by adding that which comes from the heat exchanger of the clamp. This is described below under the heading "application example".

The matrix C is a row matrix of the $1*n_x$ type. It is a row matrix insofar as it is desired to regulate only one temperature, specifically the temperature T of the cryogenic clamp 10.

In order to cool the cryogenic clamp 10 of this type of laser, the cryorefrigerator 2 may be a periodically-operating gas pulse tube that can be represented by a function of sinusoidal waveform.

Consequently, the temperature disturbance associated with the operation of the gas pulse tube applied as input to the cryogenic clamp 10 is likewise of sinusoidal waveform. The heat flux signal $S_p$ that gives rise to this temperature disturbance in the clamp 10 is thus the signal that the device 102 seeks to reconstruct. In other words, the equivalent heat flux $S_{\Phi eq}$ leads to the same effect on the temperature T of the clamp 10 as the heat flux signal $S_p$ created by the device for cooling the clamp.

The discrete state representation of the sinusoidal signal $S_p$ is then written in the form of equation (2):

$$x_{sin}(k+1) = A_{sin} \cdot x_{sin}(k) \tag{2}$$

$$S_P(k) = C_{sin} \cdot x_{sin}(k)$$

where:

$$A_{sin} = \begin{bmatrix} 2 \cdot \cos(2\pi f_p T_s) & 1 \\ -1 & 0 \end{bmatrix}$$

with $f_p$ equals the operating frequency of the gas pulse tube and $T_S$ is the sampling period of the signal $S_P$;

$$C_{sin} = (1\ 0);$$

$x_{sin}(k)$ is the state vector associated with the sinusoidal signal $S_P$ at instant k; and $x_{sin}(k+1)$ is the state vector associated with the sinusoidal signal $S_p$ at instant k+1.

By combining the state representations of equations (1) and (2), discrete state representation is obtained for the behavior of the thermal system 100' as a whole, taking account of the sinusoidal nature of the signal $S_p$ reduced to a disturbing heat flux on the inlet of the thermal system 100', i.e.:

$$\begin{bmatrix} x(k+1) \\ x_{sin}(k+1) \end{bmatrix} = \underbrace{\begin{bmatrix} A & B \cdot C_{sin} \\ 0 & A_{sin} \end{bmatrix}}_{A_O} \cdot \underbrace{\begin{bmatrix} x(k) \\ x_{sin}(k) \end{bmatrix}}_{x_O} + \underbrace{\begin{bmatrix} B \\ 0 \end{bmatrix}}_{B_O} \cdot U(k) \tag{3}$$

$$T(k) = \underbrace{[A\ \ 0]}_{C_O} \cdot \begin{bmatrix} x(k) \\ x_{sin}(k) \end{bmatrix}$$

The states of the thermal model of equation (3) are estimated with the help of a state observer.

In order to eliminate the difference between the states $x_0$ of the thermal model of equation (3) and the physical equivalents thereto $x_p$, the difference between the temperature measured by the sensor and the temperature estimated by the thermal model of equation (3) is injected by the gain vector L into equation (3), leading to the following observer matrix equation (4):

$$\begin{cases} x_o(k+1) = A_0 \cdot x_0(k) + B_0 \cdot U(k): \text{ prediction} \\ T(k) = C_0 \cdot x_0(k) \\ \text{error}(k) = T(k) - T_{measure}(k) \\ x_o(k+1) = x_o(k+1) + L * \text{error}(k) \\ x_o(k+1) = \frac{x_o(k+1)}{(k)+L} * (T_{measure}(k) - C_0 \cdot x_0(k)): \text{ correction\_prediction} \\ x_o(k+1) = (A_o - LC_o) \cdot x_o(k) + B_o \cdot U(k) + L \cdot T(k) \end{cases} \tag{4}$$

In this equation (4), the coefficients of the matrices $A_0$, $B_0$, and $C_0$ are expressed starting from the coefficients of the matrices A, B, and C and from the matrices $A_{sin}$ and $C_{sin}$ as given above. Concerning the matrices A, B, and C, numerical examples are given below in the description.

Furthermore, the temperature T is the temperature estimated by the thermal model, and the temperature $T_{measure}$ is the temperature supplied by the sensor 101.

The gain vector L is a column matrix, since there is only one temperature to regulate. This gain vector L is determined by the least squares method.

There follows a description of the least squares method suitable for being used to determine the gain vector L.

The least squares method serves to minimize the error e(k) at instant k between the states $x_0$(k) of the thermal model and their physical equivalents $x_p$(k) at the same instant k.

This error e(k) is thus a column vector that is expressed in the following form:

$$e(k) = x_p(k) - x_o(k) \tag{5}$$

The variation over time of this error e(k) may be associated with the gain vector L in the form of the following system of equations:

$$e^T(k+1) = A_o^T e^T(k) - C_o^T v(k)$$

$$v(k) = L^T e^T(k) \tag{6}$$

in which the superscript symbol T corresponds to the transpose of the matrix under consideration.

Given the system of equations (6), the gain vector is then the optimum solution that minimizes the following criterion:

$$J = \sum_{n=1}^{\infty} [e^T(n) \cdot Q \cdot e(n) + v^T(n) \cdot R \cdot v(n)] \tag{7}$$

where:

Q and R are weighting matrices.

Using the criterion of equation (7), it is possible to weight separately the estimation errors for the states $x_0$ of the thermal model of equation (3).

By adjusting the values of the weighting matrix Q, greater importance is given to the errors that are associated with the states of the disturbance associated with the signal $S_P$. The weighting matrix R serves to limit the norm of the gain vector L.

The gain vector L is calculated by means of the command dlqr( ) as implemented in Matlab® software as follows:

$$L^T = dlqr(A_o^T, C_o^T, Q, R) \tag{8}$$

The command dlqr serves to minimize the criterion of equation (7). This command solves the so-called "Riccati" matrix equation in discrete time, and the solution is written S.

Under such circumstances, the "Riccati" matrix equation is written as follows:

$$A_o S A_o^T - S - (A_o S C_o^T) \cdot (C_o S C_o^T)^{-1} \cdot (C_o S A_o^T) + Q = 0 \tag{9}$$

Once the solution to equation (9) has been obtained, the transpose of the gain vector $L^T$ is obtained as follows:

$$L^T = (C_o S C_o^T + R)^{-1} \cdot (C_o S A_o^T) \tag{10}$$

Once the gain vector has been obtained in this way, it is possible to inject it into the observer equation (4). It should be observed that methods other than least square methods may be used for determining the gain vector L. For example, it is possible to use the "pole placement" method.

Finally, in order to solve the observer equation (4), it is necessary to express the heat flux W injected into the thermal system 100' as a function of the equivalent heat flux $\Phi_{eq}$. This equivalent heat flux $\Phi_{eq}$ is obtained by covering the state corresponding to the sine of the state vector $x_0(k)$ of the observer equation (4):

$$\Phi_{eq} = [0 \, C_{sin}] \cdot x_0(k) \tag{11}$$

Physically, the link between the thermal flux W (signal $S_W$) to be injected into the cryogenic clamp 10 and the equivalent thermal flux $\Phi_{eq}$ (signal $S_{\Phi eq}$) may be performed as follows, cf. FIG. 2.

For high frequencies, i.e. for frequencies that are typically greater than 0.01 hertz (Hz), the equivalent heat flux signal $S_{\Phi eq}$ makes it possible to form the signal $S_W$ so as to compensate for the periodic variations in the temperature of the cryogenic clamp 10.

This applies in particular when the frequency is 1.4 Hz. The operating frequency of the gas pulse tube is generally 1.4 Hz. This frequency is to be found in the disturbance signal $S_P$ and in the equivalent heat flux signal $S_{\Phi eq}$, which seeks to compensate the effects of the disturbance.

The actuator 104 receiving the signal $S_W$ then injects a heat flux W into the clamp 10, which heat flux is a function of the period and the amplitude of the equivalent heat flux signal $S_{\Phi eq}$.

Nevertheless, this can sometimes lead to difficulties at low frequencies, i.e. at frequencies that are typically lower than 0.01 Hz.

That is why the device 100 may include means 103 for regulating the thermal system 100' at low frequencies in order to guarantee that the setpoint is tracked. These means 103 deliver a specific control signal $S_C$ that is to be modified by the equivalent heat flux signal $S_{\Phi eq}$ in order to form the heat flux control signal $S_W$ that is actually applied to the actuator 104.

The signal $S_C$ is a digital representation of the heat flux to be injected into the clamp 10 in order to provide regulation at these low frequencies. The interaction between the signals $S_C$ and $S_{\Phi eq}$ does not raise any difficulty, insofar the means 102 take account of the action of the means 103, given the presence of the signal $S_W$ being returned to the input of the means 102, cf. FIG. 2.

The control signal $S_C$ may be a constant vector. More generally, the signal $S_C$ maybe delivered by a regulator, for example a regulator of the proportional integral derivative (PID) type.

The interaction between the signals $S_C$ and $S_{\Phi eq}$ thus controls the period and the amplitude of the heat flux signal $S_W$ reaching the actuator 104.

The presence of the control signal $S_C$ thus makes it possible to further improve the temperature regulation of the cryogenic clamp.

This variant is more advantageous, even though using the control signal is not essential.

Advantageously, the equivalent heat flux signal $S_{\Phi eq}$ determined in step b) is injected in phase opposition. Under such circumstances, when the control signal $S_C$ is provided, it is possible to express the relationship between $S_C$, $S_W$, and $S_{\Phi eq}$ in the following form:

$$S_W = S_C - S_{\Phi eq}$$

This expression is then put into the form of discrete flux matrices in the observer matrix equation (4) in order to enable it to be solved.

The fact that the equivalent flux signal is injected in phase opposition makes it possible to minimize the heat power needed by the actuator 104. This is thus a preferred solution.

Even more preferably, the fact of injecting a heat flux in phase opposition and as close as possible to the temperature that is to be regulated makes it possible to minimize even more the heat power that needs to be injected into the cryogenic clamp 10, and thereby optimize the cooler device 1.

To this end, it is appropriate to place the actuator 104 as close as possible to the cryogenic clamp 10.

For example, the actuator 104 may advantageously be arranged beside the temperature sensor of the clamp 10.

The device 100 and the thermal system 100' may be associated with the above-described cooler device 1, with the interface between the device 100 and the cryogenic clamp 10 of the laser taking place via the actuator 104 for injecting heat flux W into the element 10 and the temperature sensor 101.

The actuator 104 may be a heat flux generator capable of delivering positive and negative powers (a thermal actuator). For example, it may be an electrical resistance carrying an alternating current. It may also be an actuator that emits electromagnetic waves in the infrared range.

In a variant, it may be an actuator 104 comprising a variable magnetic field generator associated with an isothermal heat bath for adiabatically magnetizing or demagnetizing a device connected to the element 10.

The advantage of such demagnetization is to control the temperature actively with response times that are short, and above all without loss of energy. In practice, it involves putting one or more materials inside a superconductive coil, with variations in the current carried by the coil being controlled by the thermal model in order to regulate temperature.

Unlike using heater means, this solution avoids any propagation of heat delivered to the element and makes it possible to avoid potential problems of phase shift between the heat flux injected into the element and the temperature signal $S_T$, which problems can be encountered with conventional heater means.

The principle of adiabatic demagnetization is summarized below.

If consideration is given for example to an element such as the cryogenic clamp 10 of the "MegaJoule" laser and to the device connected thereto, the material forming the clamp is made up of a plurality of magnetic moments that can be considered as constituting a corresponding number of permanent magnets of atomic or molecular size. Like magnets, the magnetic moments interact with one another within the material.

If the cryogenic clamp 10 and the device connected thereto is placed in an external magnetic field (e.g. by means of a magnetic field generator), the magnetic moments of the material become aligned with the axis and the direction of the applied field. The more intense the field, the greater the number of aligned magnetic moments. Disorder is thus reduced and entropy diminishes.

Aligning magnetic moments is an exothermal operation: it is the magnetocalorie effect.

This makes it possible to add or remove a flux of heat to or from the device connected to the cryogenic clamp, and consequently to or from the cryogenic clamp 10 itself. This is the principle of adiabatic magnetization.

By reducing the magnetic field, the magnetic moments return to their random orientations, thus requiring energy. The magnetic moments then draw from the thermal energy of the material so the temperature of the material drops: this is the principle of adiabatic demagnetization.

Finally, controlling the magnetic field makes it possible to control the heat flux W injected into the cryogenic clamp 10.

Nevertheless, it should be observed that the presence of means 101 for measuring the temperature of the cryogenic clamp 10 and the presence of an injector 104 for injecting heat flux into the cryogenic clamp 10 may involve a time delay among the various signals propagating in the device 100 and the thermal system 100'.

This time delay then gives rise to phase shifts between the signals, which signals are sinusoidal.

Consequently, the heat flux control signal $S_W$ reaching the actuator 104 presents period and amplitude that are appropriate for compensating the periodic variations in the temperature T of the elements, but phase that is not appropriate. This can lead to the regulation process being ineffective.

As shown with reference to an embodiment described below in the description, a small time delay can be ignored in the thermal model and thus in the method in accordance with the invention. Such a delay gives rise to no instability effects in the regulation system.

Nevertheless, account is advantageously taken of this time delay in the thermal model. In order to take this time delay into account in the thermal model (observer equation 4), two situations may arise, depending on whether or not the time delay generated by certain elements of the thermal system 100' is known.

1st Situation: the Time Delay is Known

Figure 3:
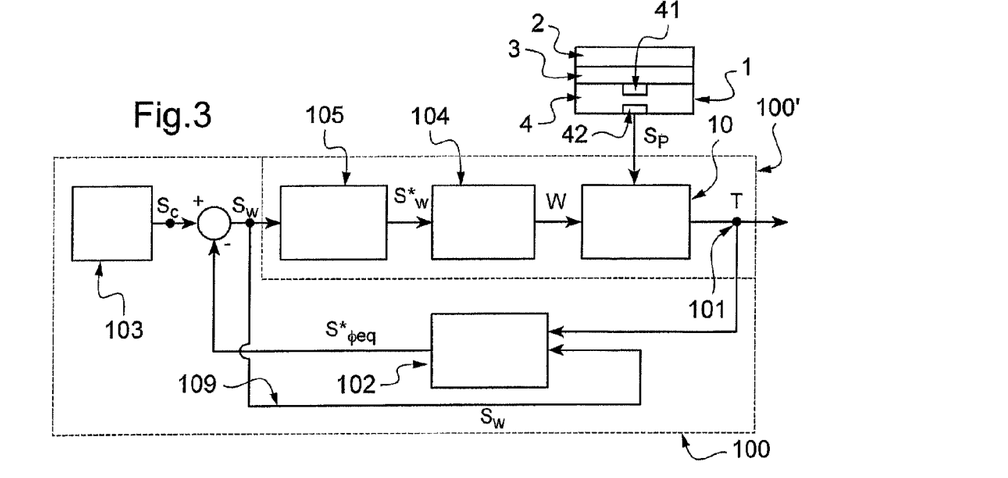
FIG. 3 is a diagram of an implementation of an improved version of the method shown in FIG. 2, this version taking account in particular of the pure delay type dynamic behavior of the various elements constituting the device for performing the invention, which behavior is known.

FIG. 3 shows the operating diagram of the method of the invention in the presence of a delay that is known. This should be compared with the diagram of FIG. 2 in which no account of this delay is taken.

As can be seen by comparing FIGS. 2 and 3, the system 100' of FIG. 3 includes means 105 representative of the known pure delay of the set of elements constituting the system.

The signal $S_W$ is thus delayed by r sampling periods in the means 105 in order to form a signal $S^*_W$.

The pure delay 105 is merely a representation of the delay that might be generated by the various elements of the thermal system 100', in particular the actuator 104 and the sensor 101. That is why the diagram of FIG. 3 incorporates this pure delay in the thermal system 100' that is to be regulated. This is an artifact for modeling the delay between the inlet and the outlet of the thermal system 100'.

It can be understood that the signal $S_W$ is expressed as a function of the signal $S^*_{\Phi eq}$ from the means 102, and, where appropriate, of the control signal $S_C$ as explained above.

It can also be understood that the equivalent heat flux signal $S^*_{\Phi eq}$ coming from the means 102 also incorporate this delay.

Figure 4:
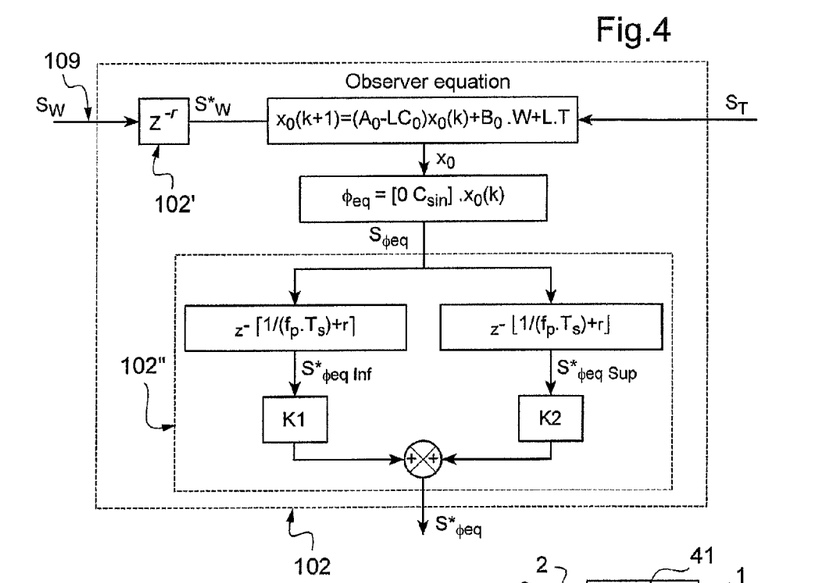
FIG. 4 is a diagram showing how a heat flux signal is determined that is associated with the periodic variation of the temperature of the element for which it is desired to regulate the temperature, in the context of the implementation of the method shown in FIG. 3.

That is why it is appropriate to operate as described below, and as shown in FIG. 4.

The means 102 receive as input the heat flux control signal $S_W$ and the temperature signal $S_T$. The signal $S_W$ is delayed by r sampling periods in the means 102' in order to form the phase shifted signal $S^*_W$, which signal is injected into the observer equation (4) and the following equations.

Solving the observer equation provides the equivalent heat flux signal $S_{\Phi eq}$.

The equivalent heat flux signal $S_{\Phi eq}$ is then stored in a buffer memory (not shown) to form two signals $S^*_{\Phi eqInf}$ to $S^*_{\Phi eqSup}$. More precisely, the signals $S^*_{\Phi eqInf}(k)$ and $S^*_{\Phi eqSup}(k)$ may be expressed in the following form:

$$S^*_{\Phi eqInf}(k)=S_{\Phi eq}(k-\lceil 1/(f_p \cdot T_S)+r \rceil) \quad (12)$$

$$S^*_{\Phi eqInf}(k)=S_{\Phi eq}(k-\lfloor 1/(f_p \cdot T_S)+r \rfloor) \quad (13)$$

where:

$\lceil 1/(f_p \cdot T_S)+r \rceil$ characterizes the delay of the signal $S_{\Phi eq}$ relative to the signal $S^*_{\Phi eqInf}$ rounded down to the next lower integer;

$\lfloor 1/(f_p \cdot T_S)+r \rfloor$ characterizes the delay of the signal $S_{\Phi eq}$ relative to the signal $S^*_{\Phi eqSup}$ rounded up to the next higher integer with:

$\lceil \, \rceil$ the mathematical operator corresponding to rounding down to the next lower integer;

$\lfloor \, \rfloor$ the mathematical operator corresponding to rounding up to the next higher integer; and r the number of sampling periods by which the signal is delayed, which number is known.

The two signals $S^*_{\Phi eqInf}$ and $S^*_{\Phi eqSup}$ then make it possible by linear interpolation to reconstitute the approximate value of the delay signal $S^*_{\Phi eq}$.

This overcomes the accuracy limit given by the sampling period, thus making it possible to reject the periodic disturbance.

Finally, it is possible to represent the signal $S^*_{\Phi eq}(k)$ as follows:

$$S^*_{\Phi eq}(k)=K1 \cdot S^*_{\Phi eqInf}(k)+K2 \cdot S^*_{\Phi eqSup}(k) \quad (14)$$

with:

K2; remainder of the integer portion of $(1/f_p T_S)+r$;
K1=1−K2;
$f_p$ frequency of the disturbing signal $S_p$; and
$T_S$ sampling period.

At the output from the means 102, an equivalent heat flux signal $S^*_{\Phi eq}$ is obtained that is phase shifted and of amplitude that is different from the temperature signal $S_T$. This is performed in two substeps that are associated with the step b), namely a first substep in which the signal $S_{\Phi eq}$ (heat flux) is reconstructed on the basis of the measured temperature T of the cryogenic clamp 10, and a second substep in which the signal as reconstructed in this way is delayed.

During the step b), the previously determined equivalent heat flux signal is thus also delayed relative to the phase of the temperature signal as determined in step a).

2nd Situation: the Time Delay is not Known

Figure 5:
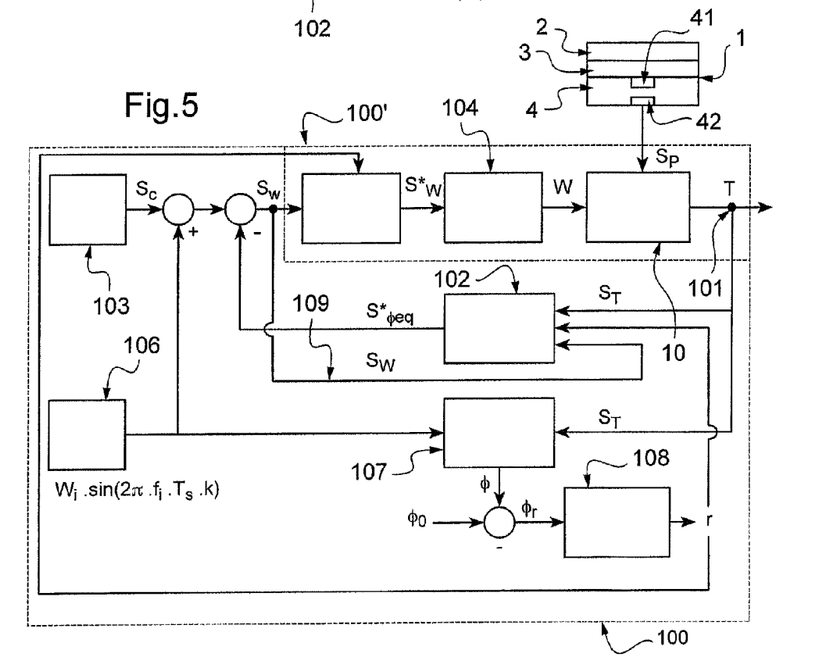
FIG. 5 is a diagram of an implementation of an improved version of the method shown in FIG. 2, this version taking account in particular of the pure delay type dynamic behavior of the various component elements of the device for performing the invention, which behavior is not known but is estimated.

FIG. 5 shows the operation of the method of the invention in the presence of a delay that is not known. In particular, the diagram shown in FIG. 4 should be compared with the diagrams shown in FIG. 2 (no account taken of the time delay) and FIG. 3 (delay known).

When the delay associated with the various elements making up the thermal system 100' is not known, it needs to be estimated and then taken into account in order to reconstruct the equivalent heat flux $S^*_{\Phi eq}$.

There are several methods in existence for identifying a time delay in linear systems. Reference may be made for example to the document "Survey and comparison of time-delay estimation methods in linear systems", Svante Björklund, PhD thesis, 2003, which describes some of those methods.

Specifically, a so-called "approximate" method in the frequency domain has been selected.

For this purpose, an identification signal is used for identifying the phase shift generated by the thermal system. This identification signal is provided by appropriate means 106, such as a function generator, and it is in a form close to the signal that is representative of the operation of the cryorefrigerator, e.g. a gas pulse tube, and thus close to the disturbance signal. Specifically, it is thus a sinusoidal heat flux signal $S_{Wi}$ that is expressed in the following form:

$$S_{Wi}(k) = W_i \cdot \sin(2\pi \cdot f_i \cdot T_S \cdot k) \qquad (15)$$

where:
$f_i$ is the frequency of the identification signal, which frequency is close to the operating frequency of the gas pulse tube;
$T_S$ is the sampling period of the signal; and
$W_i$ is the amplitude of the signal.

The identification signal $S_{Wi}$ is injected into the thermal system 100' having the components that might generate a delay, specifically in particular the cryogenic clamp 10, the actuator 104, and the sensor 101. At the output of the cryogenic clamp 10, i.e. the location where the temperature T of the clamp 10 that is to be regulated is measured, the identification signal is phase shifted by a phase φ relative to the signal coming from the function generator.

The phase shift φ is determined in the means 107, e.g. by performing spectrum analysis.

For this purpose, the identification signal $S_{Wi}$ is injected from the function generator to the element 107. In parallel, the signal $S_T$ as taken from the output from the clamp 10, is transmitted to the means 107.

To determine this phase shift 4, the means 107 may perform this spectrum analysis by means of a digital filter based on Goertzel's algorithm.

This algorithm is known to the person skilled in the art and more information on this subject may be obtained from the document "Goertzel's algorithm", Douglas L. Jones, 2006.

The transfer function H from the input of the filter to the output of the filter is written in the following form:

$$H(z) = \frac{1}{(1 - 2.\cos(2.\pi.f).z^{-1} + z^{-2})} \qquad (16)$$

where f is the frequency that is to be extracted (spectrum analysis) and z is the numerical variable of the filter.

To determine the phase shift phi=φ; the transfer function of the Goertzel filter is calculated over N samples. In addition, using the last two values of the filter (d1, d2), the imaginary and real parts ("imag" and "real") are calculated. Finally, the looked-for phase is deduced therefrom by calculating the arc tangent ("a tan") of the ratio between the imaginary part and the real part.

The program is as follows:

```
realW = 2.0*cos(2.0*pi*k/N);
imagW = sin(2.0*pi*k/N);
d1 = 0.0;
d2 = 0.0;
for (n=0; n<N; ++n)
    {
        y = x(n) + realw*d1 - d2;
        d2 = d1;
        d1 = y;
    }
real = 0.5*realW*d1 - d2;
image = imagW*d1;
phi=atan(imag/real)
```

It should be observed that other algorithms could be used in order to determine the phase shift, such as algorithms that make use of fast Fourier transforms (FFTs).

Also determined is the phase shift $\phi_0$ that needs to be applied to the identification signal $S_{Wi}$ coming from the function generator 106 on the basis of the thermal model described with reference to equations (1) to (11) modeling the behavior of the thermal system, in the absence of any account being taken of a delay. This amounts to implementing the thermal model on the basis of the diagram of FIG. 2.

By comparing the phase shift φ determined by spectrum analysis with the phase shift $\phi_0$ determined by the thermal model described with reference to equations (1) to (11) in the absence of any delay, it is deduced that the difference $\phi_r, \phi - \phi_0$ is a phase shift that is indeed associated with the time delay generated by the thermal system 100'.

It is then necessary to express the phase shift $\phi_r$ in the form of a time delay. This is done by taking account at least of the value of this phase shift $\phi_r$ and of the frequency $f_i$ of the identification signal.

This time delay is preferably expressed as a number of sampling periods, thereby involving the sampling period $T_S$ of the signal. Under such circumstances, the phase shift $\phi_r$ may be associated with the number $\bar{r}$ of delay sampling periods, in the form of:

$$\bar{r} = \frac{\varphi_r}{2\pi.f_i.T_s} \qquad (17)$$

This number of sampling periods is calculated in the means 108.

The number $\bar{r}$ is determined continuously and may present a certain amount of instability, given that the phase shift determined in the means 107 using Goertzel's algorithm is not necessarily stable.

In order to remedy such a potential drawback, the means 108 advantageously perform non-linear filtering on the number $\bar{r}$. An example of non-linear filtering that can be performed is shown in FIG. 6.

Figure 6:
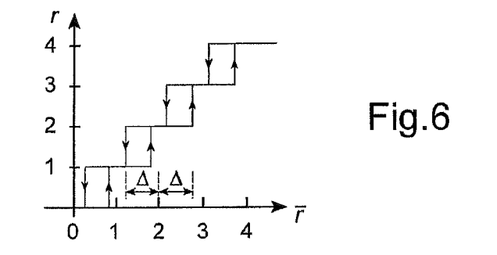
FIG. 6 is a diagram showing the operation of a non-linear filter suitable for being used in the estimation carried out in the context of the method shown in FIG. 5.

Along the abscissa axis, FIG. 6 plots the number $\bar{r}$ as obtained using equation (17) and up the ordinate axis it plots the number r of sampling periods after filtering. It can be seen that the non-linear filtering performs a correction referred to as Δ.

This correction Δ is evaluated as follows.

It is known that the thermal system 100' is robust in the face of delay variations of two sampling periods. A correction Δ is then selected to be equal to 1.5 sampling periods. This is a compromise between reactivity of the thermal system 100' and robustness. With this approach, erroneous values of the time delay are not taken into account.

The number r of sampling periods representative of the time delay as estimated in this way is used in the means 102 to calculate the equivalent heat flux $S^*_{\Phi eq}$.

For this purpose, it is possible to refer to the description above based on the diagram of FIG. 4. Nevertheless, in this situation, the inputs of the means 102 comprise the heat flux control signal $S_W$, the temperature signal $S_T$ associated with the measured temperature of the clamp 10, and this estimated number r of sampling periods. It then suffices to modify the diagram of FIG. 4 by adding an additional input connected to the means 102'.

Naturally, if no linear filtering is performed in compliance with that shown in FIG. 6, then it is the number $\bar{r}$ that is injected into the means 102.

FIG. 5 shows more specifically what happens in the means 102.

It should be observed that the methodology used makes it possible to return to the situation analogous to that of the diagram shown in FIG. 3 (which shows what happens in the calculation means 102), where the control flux sensor $S_W$ is delayed by r sampling periods prior to being injected in the observer equation.

Advantage is taken of the number r of the sampling periods to delay the signal $S_W$ in the means 102', which impart a pure delay in order to deliver the phase shifted signal $S^*_W$. This signal (equivalent to the heat flux W) is injected into the observer equation.

Thus, at the output from the means 102, a phase shifted reconstructed equivalent heat flux signal $S^*_{\Phi eq}$ is obtained that can be injected in phase opposition into the actuator 104, and consequently into the clamp 10.

Advantageously, the signal formed is written more precisely:

$$S_W = S_C - S^*_{\Phi eq}$$

and this is the signal that is transmitted to the thermal system 100'.

APPLICATION EXAMPLE

In order to show up the pertinence of the invention, a digital simulation has been performed for the clamp of the "MegaJoule" laser.

Figure 7:
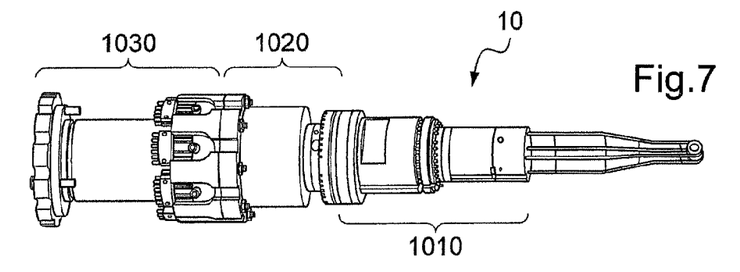
FIG. 7 shows a cryogenic clamp in a perspective view.

This clamp is shown in FIG. 7.

Furthermore, a known time delay, associated with the dynamic behavior of the various elements making up the clamp 10 was taken into consideration.

This time delay thus incorporated in particular the delays associated with the temperature sensors and with the actuators that physically generate the heat flux.

Figure 8:
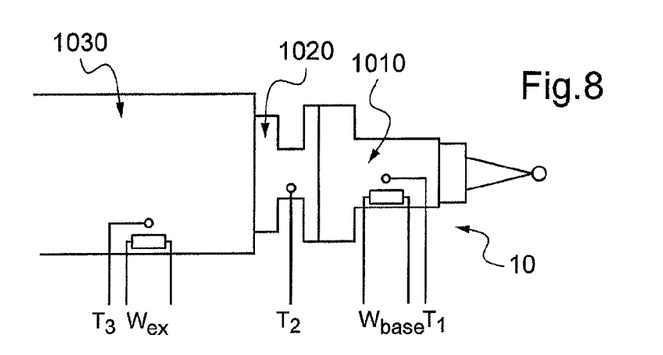
FIG. 8 is a diagrammatic view of the FIG. 7 clamp showing how the various temperature sensors and the various actuators are installed.

Specifically, the model assumes that three temperature sensors T1, T2, and T3 are provided respectively on the heat exchanger 1030, on the anvil 1020, and on the base 1010. Furthermore, it was assumed that two actuators were taken into account, respectively one acting on the base 1010 ($W_{base}$) and another on the heat exchanger 1030 ($W_{ex}$).

A diagram showing where the temperature sensors and the actuators are located is to be found in FIG. 8.

The selected conditions were as follows.

The coefficients of the matrix $C_{sin}$ were known.

The coefficients of the matrix $A_{sin}$ could be determined from the frequency $f_p$ and the sampling period $T_S$. Specifically, the operating frequency $f_p$ of the gas pulse tube 2 was $f_p = 1.4$ Hz, the signal being sinusoidal (corresponding to a period of about 714 ms), and, for this simulation, the sampling period was $T_S = 80$ ms.

Furthermore, the system of equations (1) was established by using a heat-electricity analogy for the various elements of the clamp 10, taking the three temperature sensors and the two actuators into consideration.

The heat-electricity analogy is well known to the person skilled in the art. In brief, it is recalled that a temperature may be associated with an electric potential, a thermal capacity (corresponding to the product of the specific thermal capacity of an article in question multiplied by its weight) may be associated with an electrical capacitance, a heat flux may be associated with an electric current, and a thermal resistance may be associated with an electrical resistance.

Figure 9:
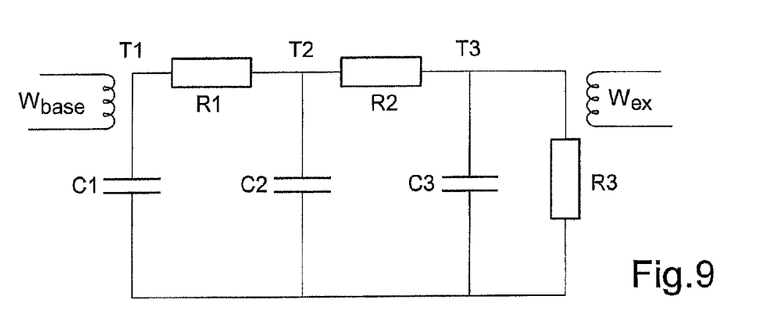
FIG. 9 is an electrical circuit diagram equivalent to the "thermal" circuit of FIG. 8.

The electrical circuit diagram equivalent to the thermal diagram of FIG. 8 is given in FIG. 9. In FIG. 9, the index 1 corresponds to the base 1010, the index 2 to the anvil 1020, and the index 3 to the heat exchanger 1030.

The base 1010 and the anvil 1020 were considered as being made of aluminum and the heat exchanger as being made of copper. Furthermore, it was considered that the weight of the base 1010 was 218 grams (g), the weight of the anvil 1020 was 143 g, and the weight of the heat exchanger 1030 was 692 g.

As a function of the natures of the materials, it is possible to use simplifying assumptions.

Furthermore, account should be taken of the dynamic aspect of the active filtering performing by the invention, since the thermal-electrical analogy is not capable on its own of defining the matrices A, B, and C.

This forms part of the know-how of the Applicant.

Nevertheless, in order to perform the invention, the following numerical values are given for these matrices in this example:

$$A = \begin{bmatrix} 0.8187 & 0 & 0 & 0 \\ 0.0677 & 0.8714 & 0.1285 & 0 \\ 0.0008 & 0.0299 & 0.9670 & 0 \\ 0 & 0.1993 & 0 & 0.8007 \end{bmatrix}$$

$$B = \begin{bmatrix} 0.1813 \\ 0 \\ 0 \\ 0 \end{bmatrix}$$

$$C = \begin{bmatrix} 1 & 0 & 0 & 0 \end{bmatrix}$$

The amplitude of the temperature T of the cryogenic clamp 10 in the absence of the regulation performed by the method of the invention was set at 5 mK. This value is realistic compared with presently available experimental data for the device shown in FIG. 1 of the "MegaJoule" laser. It can thus be understood that the amplitude of 5 mK is the amplitude presently obtained on the clamp of the "MegaJoule" laser when using the stabilizer 3 and the cooler circuit 4, but without the regulation as performed in the invention.

The time delay $T_r$ associated with the various elements making up the device 100 was set at $T_r = 195$ ms.

Under such circumstances, we have K2=0.366 ($f_p$=1.4 Hz; $T_S$=80 ms; r=$T_r/T_S$=2.4375), and K1=0.634.

Figure 10:
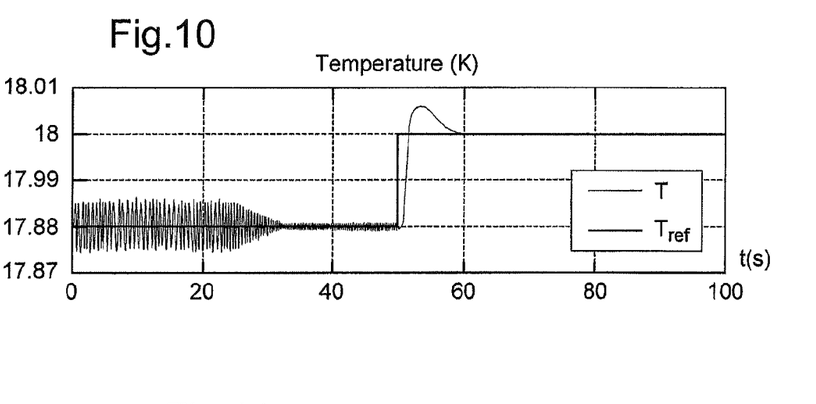
FIG. 10 is a diagram showing the variation as a function of time in the temperature of the element for which it is desired to regulate temperature, specifically the cryogenic clamp of the "MegaJoule" laser, when using a filter in the method shown diagrammatically in FIGS. 3 and 4.

The results that were obtained are shown in FIG. 10.

FIG. 10 shows the variation of the temperature T (in kelvins) of the cryogenic clamp 10 as a function of time t (in seconds).

Between t=0 seconds (s) and t=25 s, the filtering of the invention was not performed. Periodic variation in this temperature can thus be seen with an amplitude of 5 mK (a peak to peak amplitude of 10 mK) about a reference value $T_{ref}$=17.98 K.

At time t=25 s, the active filtering of the invention was started. It can be observed that temperature variation diminished clearly, with the amplitude of the temperature T variation being of mK order about the same reference value.

Then at time t=50 s, an increase in the reference temperature T was imposed on the cryogenic clamp 10, this temperature being raised so that $T_{ref}$=18 K.

It can then be seen that the variation in the temperature T of the cryogenic clamp 10 was of mK order about this new reference value, after a transient of about ten seconds.

As specified above, there is no need to take a time delay into account in the thermal model providing the time delay is "small".

Figure 11:
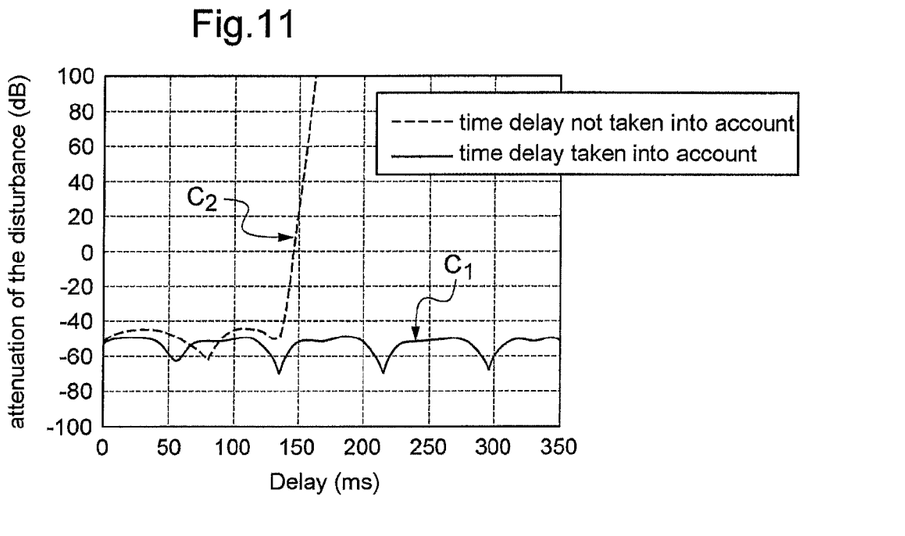
FIG. 11 is a diagram showing the attenuation of the temperature disturbance in the element for which it is desired to regulate temperature, specifically the cryogenic clamp of the "MegaJoule" laser, as a function of the delay generated by the various elements constituting the device for performing the methods shown in FIGS. 2 and 3.

This is shown in FIG. 11.

FIG. 11 shows the attenuation in the variations of the temperature T of the cryogenic clamp 10 as a function of the time delay that is actually generated.

A first curve C1 shows how this attenuation varies while taking this known time delay into account. A second curve C2 shows how this attenuation varies when no account is taken of this time delay in the regulation performed in the context of the invention.

It can be seen that the observation is comparable to that of the curve C1 up to a time delay having a value of 130 ms. Beyond that it is necessary for the time delay to be taken into account in the thermal model.

Advantageously, this time delay is taken into account in the thermal model, and thus in the method of the invention, but in certain circumstances it can be ignored.

Results of a Test

In order to confirm the pertinence of the invention, a test was carried out on a real system. The test system was similar to the system including the clamp of the "MegaJoule" laser.

Figure 12:
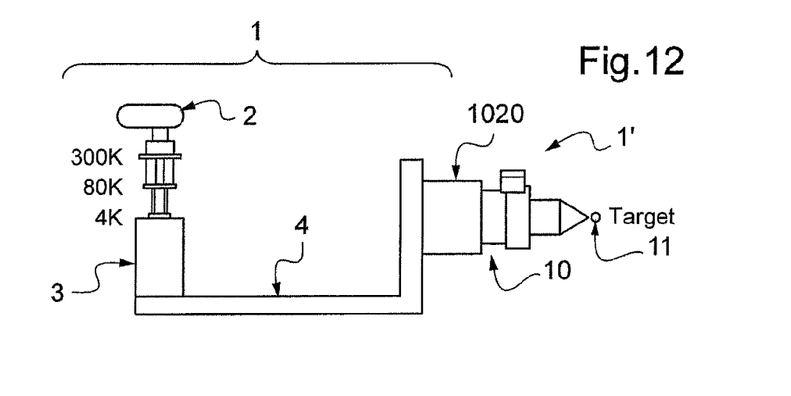
FIG. 12 is a diagram of a real device serving as an experimental test installation for validating the advantage of the invention.

This is shown in FIG. 12.

Unlike that which is shown in FIG. 8, this test system did not have a base 1010 for carrying the target 11, and consequently it did not have the target 11 itself. Nor did it have the heat exchanger 1030, insofar as the means 4 comprise a bar having the function of representing the cooling circuit of FIG. 1. Nevertheless, the base 1010 and the target 11 carried thereby are shown in FIG. 12 to inform the reader where they should be installed within the system.

Furthermore, the system had two gas pulse tubes 2.

In this example, the idea was thus to regulate the temperature of the anvil 1020, which was provided with a temperature sensor. A thermal actuator (not shown) was also provided on the anvil 1020, close to the temperature sensor.

The conditions selected were as follows:

the coefficients of the matrix $C_{sin}$ were known;

the coefficients of the matrix $A_{sin}$ could be determined from the frequency $f_p$ and the sampling period $T_S$. Specifically, the operating frequency $f_p$ of the gas pulse tubes 2 was $f_p$=1.412 Hz, the signal being sinusoidal (with this corresponding to a period of about 708.2 ms). In this step, the sampling period was $T_S$=40 ms.

As in the above-described "application example", a thermal-electrical analogy was used, taking the following elements into account: stabilizer 3, bar 4, and anvil 1020.

The stabilizer 3, the bar 4, and the anvil 1020 were all made of copper. The stabilizer 3 had a weight of 10.892 kilograms (kg), the bar 4 a weight of 5.92 kg, and the anvil a weight of 1020 1.74 kg.

Figure 13:
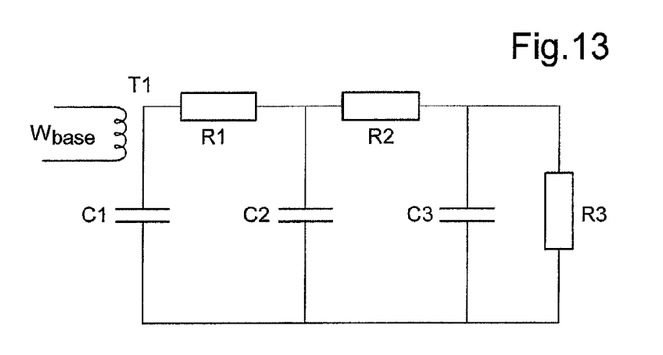
FIG. 13 is an electrical circuit diagram equivalent to the experimental installation shown in FIG. 12.

The equivalent electrical circuit diagram is shown in FIG. 13. In FIG. 13, index 1 corresponds to the anvil 1020, index 2 to the bar 4, and index 3 to the stabilizer 3.

Once more, simplifying assumptions can be used.

Furthermore, account should be taken of the dynamic aspect of the active filtering performed by the invention, since the thermal-electrical analogy is not capable on its own of defining the matrices A, B, and C.

This forms part of the know-how the Applicant.

In order to perform the invention, the matrices A, B, and C were delivered as below in this specific example:

$$A = \begin{bmatrix} -9.1560 & 9.1560 & 0 \\ 2.6911 & -4.8776 & 2.1865 \\ 0 & 1.1884 & -1.4601 \end{bmatrix}$$

$$B = \begin{bmatrix} 0.5951 \\ 0 \\ 0 \end{bmatrix}$$

$$C = \begin{bmatrix} 1 & 0 & 0 \end{bmatrix}$$

The amplitude of the temperature T of the cryogenic clamp 10 in the absence of regulation performed by the method of the invention was set at around 10 mK. It can thus be understood that the amplitude of 10 mK is that which is presently obtained on the clamp of the "MegaJoule" laser, while using the stabilizer 3 and the replacement of the helium cooling circuit 4 with a copper bar, but without using the regulation of the invention.

The time delay $T_r$ associated with the elements constituting the device 100 was measured at about $T_r$=45 ms. The delay was thus a known delay.

Specifically: we had K2=0.83 ($f_p$=1.412 Hz; $T_S$=40 ms; r=$T_r/T_S$=1.125), and K1=0.17.

Figure 14:
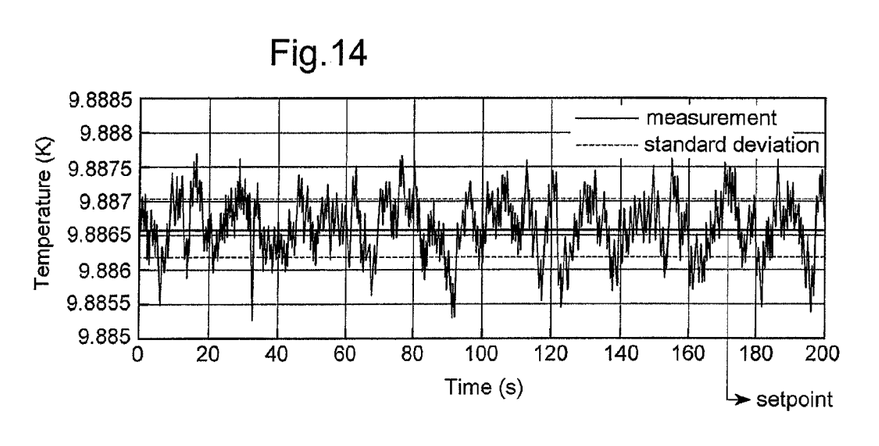
FIG. 14 shows the variation in the temperature of the element for which it is desired to regulate temperature and forming part of the experimental installation of FIG. 12.

The results obtained are shown in FIG. 14.

FIG. 14 shows variation in the temperature T (in kelvins) of the cryogenic clamp 10 as a function of time t (in seconds). Under steady conditions, it can be seen that the rapid oscillations at 1.4 Hz were practically rejected (<1 mK), whereas without regulation the oscillations at 1.4 Hz had an amplitude of 10 mK.

The invention claimed is:

1. A method of regulating the temperature of an element (10) cooled by a cryorefrigerator (2) with periodic operation, the method being characterized in that it comprises the following steps:
    a) measuring at least the periodic time variation of the temperature T of the element (10), this variation serving to obtain a temperature signal representative of the periodic operation of the cryorefrigerator (2);
    b) constructing an "equivalent" periodic heat flux signal ($S_{\phi eq}$, $S^*_{\phi eq}$) as a function of the temperature signal obtained in step a);
    c) constructing a heat flux control signal ($S_W$) depending on the equivalent heat flux signal constructed in step b), said heat flux control signal ($S_W$) also serving, by return, in the construction of the equivalent heat flux signal ($S_{\phi eq}$, $S^*_{\phi eq}$) during step b); and
    d) injecting a heat flux (W) into the element (10) on the basis of the heat flux signal ($S_W$) constructed in step c), in order to compensate for the measured periodic variations in the temperature T of the element.

2. A method according to claim 1, wherein the heat flux control signal ($S_W$) also depends on a control signal ($S_C$) for improving the compensation of the periodic variations in the temperature of the element at low frequencies.

3. A method according to claim 2, wherein the heat flux (W) injected into the element in step c) depends on the difference between the control signal ($S_C$) and the equivalent heat flux signal ($S_{\phi eq}$, $S^*_{\phi eq}$) constructed in step b) in order to limit the heat power injected into the element that is needed for compensating periodic variations of its temperature.

4. A method according to claim 1, wherein step b) also comprises an additional step consisting in delaying the previously constructed equivalent heat flux signal ($S_{\phi eq}$) relative to the phase of the temperature signal determined in step a).

5. A method according to claim 4, wherein a step is provided that consists in estimating the value of the time delay.

6. A method according to claim 5, wherein the estimation of the time delay comprises the following steps:
   $b_1$) injecting an identification signal for identifying the time delay in a thermal system (100') comprising the element for which it is desired to regulate the temperature, and a device (100) for performing the method, the identification signal presenting a waveform and a frequency close to those of the signal representative of the operation of the cryorefrigerator;
   $b_2$) determining the phase shift $\phi$ of the identification signal at the output from the thermal system, this phase shift being associated with the time delay that is to be estimated;
   $b_3$) calculating the phase shift $\phi_0$ of this identification signal with a model representing the thermal behavior of the thermal system (100') in the absence of any delay;
   $b_4$) calculating the phase shift $\phi_r$ associated with the time delay using the following relationship:

$\phi_r = \phi - \phi_0$ $b_5$) estimating the time delay at least on the basis of the phase shift $\phi_r$ calculated in step $b_4$) and of the frequency of the identification signal, said delay being used for delaying the equivalent heat flux signal.

7. A device for performing the method according to claim 1 for regulating the temperature of an element (10) cooled by a cryorefrigerator (2) with periodic operation, the device being characterized in that it comprises:
   at least one temperature sensor (101) for measuring the periodic variation in the temperature T of the element (10) associated with the periodic operation of the cryorefrigerator (2);
   a processor or a set of processors (102, 103, 106, 107, 108) for determining the equivalent heat flux ($S_{\phi eq}$, $S^*_{\phi eq}$) associated with said periodic variation of the temperature T of the element (10);
   at least one actuator (104) for injecting a heat flux (W) into the element (10) on the basis of a heat flux control signal ($S_W$) depending on the equivalent heat flux signal ($S_{\phi eq}$, $S^*_{\phi eq}$); and
   a connection line (109) for injecting the heat flux control signal ($S_W$) to the input at least of said processor or set of processors (102) for determining the equivalent heat flux ($S_{\phi eq}$, $S^*_{\phi eq}$).

8. A device according to claim 7, wherein the processor (103) is provided that are capable of delivering a control signal ($S_C$) for improving the compensation of the periodic variations in the temperature of the element at low frequencies.

9. A device according to claim 7, wherein the actuator (104) for injecting a heat flux into the element (10) comprise a variable magnetic field generator associated with an isothermal heat bath for adiabatically magnetizing or demagnetizing a device connected to the element (10).

10. A device according to claim 7, wherein said temperature sensor (101) for determining the periodic variation of the temperature of the element (10) and said means (104) for injecting a heat flux (W) into the element (10) are arranged side by side.

11. A cryogenic installation for cooling an element (10) with a cryorefrigerator (2) with periodic operation, said installation including a stabilizer (3) connected to the cryorefrigerator (2) and a cooling circuit (4) having a first heat exchanger (41) connected to the stabilizer (3), and a second heat exchanger (42) connected to the element (10), the installation being characterized in that it further comprises a device according to claim 7.

* * * * *